(12) United States Patent
Takeshita

(10) Patent No.: US 8,098,288 B2
(45) Date of Patent: Jan. 17, 2012

(54) IMAGING APPARATUS AND METHOD OF CONTROLLING IMAGING

(75) Inventor: Nobuaki Takeshita, Miyagi (JP)

(73) Assignee: FujiFilm Corporation, Tokyo (JP)

( * ) Notice: Subject to any disclaimer, the term of this patent is extended or adjusted under 35 U.S.C. 154(b) by 483 days.

(21) Appl. No.: 12/347,665

(22) Filed: Dec. 31, 2008

(65) Prior Publication Data
US 2009/0174789 A1    Jul. 9, 2009

(30) Foreign Application Priority Data
Jan. 4, 2008    (JP) ................................. 2008-000053

(51) Int. Cl.
H04N 5/228    (2006.01)
(52) U.S. Cl. .................................... 348/208.6; 348/262
(58) Field of Classification Search .................. None
See application file for complete search history.

(56) References Cited

U.S. PATENT DOCUMENTS

| 6,198,505 | B1 * | 3/2001 | Turner et al. ............... 348/222.1 |
| 2005/0219642 | A1 * | 10/2005 | Yachida et al. ............... 358/448 |
| 2006/0044408 | A1 * | 3/2006 | Nishizawa ............... 348/222.1 |
| 2006/0119710 | A1 * | 6/2006 | Ben-Ezra et al. ......... 348/208.99 |
| 2007/0189386 | A1 * | 8/2007 | Imagawa et al. .......... 375/240.12 |
| 2008/0226170 | A1 * | 9/2008 | Sonoda ......................... 382/173 |

FOREIGN PATENT DOCUMENTS

| JP | 09163210 A * | 6/1997 |
| JP | 2007-19571 A | 1/2007 |

* cited by examiner

Primary Examiner — Lin Ye
Assistant Examiner — Dennis Hogue
(74) Attorney, Agent, or Firm — Birch, Stewart, Kolasch & Birch, LLP

(57) ABSTRACT

In an imaging apparatus according to an aspect of the present invention, three images are picked up by a CCD having a color filter, and thirteen images are picked up by a CMOS having no color filter. Three of thirteen images are picked up at the same timing as by the CCD. A motion vector data between the images is calculated from the thirteen image data of the CCD. Further, the motion vector data is integrated to calculate motion vector data between a previous pickup image and a present pickup image, and motion vector data between the present pickup image and a following pickup image. A predicted image of the present pickup image is generated from the motion vector data, the previous pickup image, and the following pickup image. A weighted average is calculated between the predicted image and the present pickup image, which are synthesized into an image having decreased hand jiggling.

3 Claims, 7 Drawing Sheets

CMOS21 (NO COLOR FILTER)

CCD18 (WITH COLOR FILTER 36)

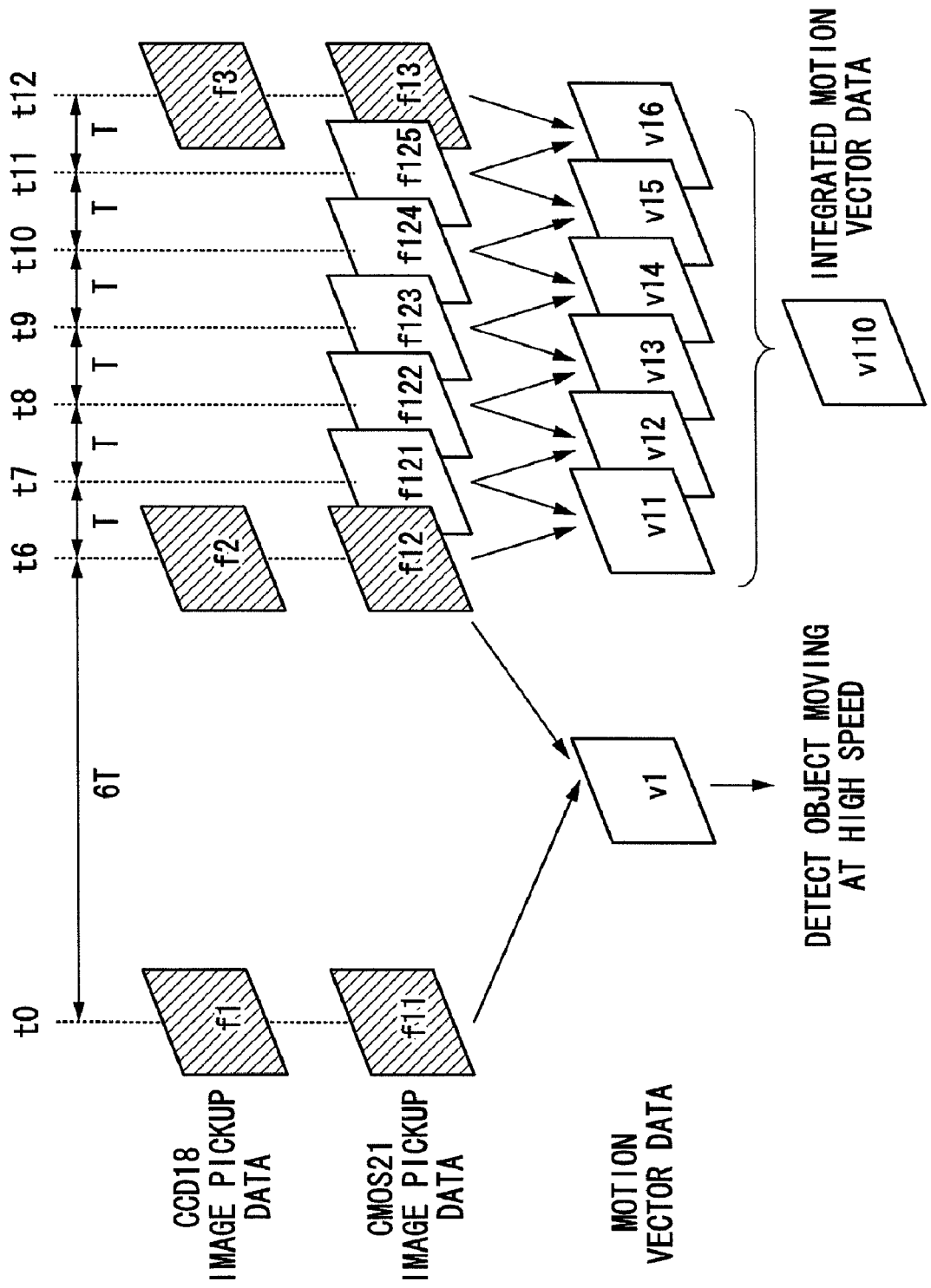

IMAGING APPARATUS AND METHOD OF CONTROLLING IMAGING

BACKGROUND OF THE INVENTION

1. Field of the Invention

The present invention relates to an imaging apparatus and a method of controlling imaging, and in particular to the imaging apparatus and the method of controlling imaging for picking up an image simultaneously by two imaging elements to improve quality of image data.

2. Description of the Related Art

A technology is known that enables a user to continuously pick up a plurality of images when picking up images by a digital camera in order to detect motion vectors from the images and perform hand jiggling compensation using the detected motion vectors.

For example, Japanese Patent Application Laid-Open No. 2007-19571 proposes a technology that incorporates jiggling detection and a motion-vector detection device for detecting a motion vector obtained by frame information of images and calculates by mixing two detected amounts according to the picked-up still images and moving images to perform image compensation. According to the technology, the jiggling compensation can be most appropriately performed particularly to exposure conditions for picking up still images.

SUMMARY OF THE INVENTION

However, the apparatus proposed in Japanese Patent Application Laid-Open No. 2007-19571 has a drawback in which a compensation apparatus of an optical system is required in order to perform jiggling compensation. Further, the apparatus has a problem in which, on calculating motion vectors, if an imaging element having a normal single-plate system is used, noise can cause detection errors when picking up images in darkness.

The present invention has been achieved in view of such problems. A purpose of the present invention is to provide the imaging apparatus and the method of controlling imaging for picking up an image simultaneously by two imaging elements to realize jiggling compensation with high accuracy and encoding of moving images.

An imaging apparatus according to a first aspect of the present invention to achieve the object comprises a light splitting device splitting splits incident light entering from an object to an imaging optical system into first object light and second object light, a first imaging device which includes a color imaging element for receiving the first object light and obtains a first image signal of three primary colors, a second imaging device which includes a white-black imaging element for receiving the second object light and obtains a second image signal of white and black, a first image-obtaining device which obtains a plurality of the first image signals that are continuously picked up by the first imaging device at a predetermined time interval and include an image signal of a present image pickup, a second image-obtaining device which obtains a plurality of the second image signals that are picked up by the second imaging device at a shutter speed higher than that when the first image signals are picked up and include image signals picked up at a timing same as that of the plurality of the first image signal, a device which calculates a motion vector between the plurality of the first image signals based on the plurality of the second image signals, a device which generates a predicted image signal of the present image pickup based on the motion vector and one or more first image signals other than the image signal of the present image pickup, and an image generation device that generates an image based on the image signal of the present image pickup and the predicted image signal thereof.

Accordingly, the high-quality image free from hand jiggling can be generated.

As described in a second aspect of the present invention, in the imaging apparatus according to the first aspect, the second image-obtaining device obtains the plurality of the second image signals continuously picked up at a time interval shorter than that of the first imaging device.

Accordingly, the motion vector can be accurately estimated.

As described in a third aspect of the present invention, the imaging apparatus according to either one of the first and second aspects, further comprises a device which detects hand jiggling of the image signal of the present image pickup based on the motion vector between the plurality of the first image signals, and the image generation device generates an image by calculating an weighted average between the image signal of the present image pickup and the predicted image signal thereof to compensate the hand jiggling of the image signal of the present image pickup.

Accordingly, the hand jiggling of the present image pickup can be decreased.

In order to achieve the object the imaging apparatus according to a fourth aspect of the present invention comprises a light splitting device which splits incident light entering from an object to an imaging optical system into first object light and second object light, a first imaging device which includes a color imaging element for receiving the first object light and obtains a first image signal of three primary colors, a second imaging device which includes a white-black imaging element for receiving the second object light and obtains a second image signal of white and black, a first image-obtaining device which obtains a plurality of the first image signals that are continuously picked up by the first imaging device at a predetermined time interval, a second image-obtaining device which obtains a plurality of the second image signals that are picked up by the second imaging device at the shutter speed higher than that when the first image signals are picked up and include image signals picked up at a timing same as that of the plurality of the first image signal, a device which calculates a motion vector between the plurality of the first image signals based on the plurality of the second image signals, and a device which compresses and encodes the plurality of the first image signal using the motion vector.

Accordingly, an accuracy of estimating the motion vector and quality of the moving image can be improved.

As described in a fifth aspect of the present invention, the imaging apparatus according to the fourth aspect, further comprises a device which detects a moving object based on the motion vector, and, when a moving object is detected, the second image-obtaining device obtains the plurality of the second image signals that have continuously picked up at a time interval shorter than that when the first imaging device picks up the images.

Accordingly, even when the object moves quickly, the motion vector can be correctly estimated.

As described in a sixth aspect of the present invention, in the imaging apparatus according to the fifth aspect, when a moving object is detected, the second imaging device increases photographic sensitivity.

Accordingly, the shutter speed can be increased, and the motion vector can be correctly estimated.

In order to achieve the object, a method of controlling imaging according to a seventh aspect of the present invention comprises a light splitting step of splitting incident light entering from an object to an imaging optical system into first object light and second object light, a first imaging step of obtaining a first image signal of three primary colors by a color imaging element for receiving the first object light, a second imaging step of obtaining a second image signal of white and black by a white-black imaging element for receiving the second object light, a first image-obtaining step of obtaining a plurality of the first image signals that are continuously picked up by the first imaging step at a predetermined time interval and include an image signal of a present image pickup, a second image-obtaining step of obtaining a plurality of the second image signals that are picked up by the second imaging step at the shutter speed higher than that when the first image signals are picked up and include image signals picked up at a timing same as that of the plurality of the first image signal, a step of calculating a motion vector between the plurality of the first image signals based on the plurality of the second image signals, a step of generating a predicted image signal of the present image pickup based on the motion vector and one or more first image signals other than the image signal of the present image pickup, and an image generation step of generating an image based on the image signal of the present image pickup and the predicted image signal thereof.

Accordingly, the high-quality image free from hand jiggling can be generated.

In order to achieve the object, a method of controlling imaging according to the eighth aspect of the present invention comprises a light splitting step of splitting incident light entering from an object to an imaging optical system into first object light and second object light, a first imaging step of obtaining a first image signal of three primary colors by a color imaging element for receiving the first object light, a second imaging step of obtaining a second image signal of white and black by a white-black imaging element for receiving the second object light, a first image-obtaining step of obtaining a plurality of the first image signals that are continuously picked up by the first imaging step at a predetermined time interval, a second image-obtaining step of obtaining a plurality of the second image signals that are picked up by the second imaging step at the shutter speed higher than that when the first image signals are picked up and include image signals picked up at a timing same as that of the plurality of the first image signal, a step of calculating a motion vector between the plurality of the first image signals based on the plurality of the second image signals, and a step of compressing and encoding the plurality of the first image signal using the motion vector.

Accordingly, the accuracy of estimating the motion vector and quality of the moving image can be improved.

According to the present invention, an imaging apparatus and a method of controlling imaging that realize jiggling compensation with high accuracy and encoding of a moving image can be provided.

BRIEF DESCRIPTION OF THE DRAWINGS

FIG. 7 illustrates processing of motion vector data calculated from timings for picking up images by the CCD 18 and the CMOS 21 and each of the images.

DETAILED DESCRIPTION OF THE PREFERRED EMBODIMENTS

Embodiments for implementing the present invention will be described with reference to Figs. as follows.

Embodiment 1

Figure 1:
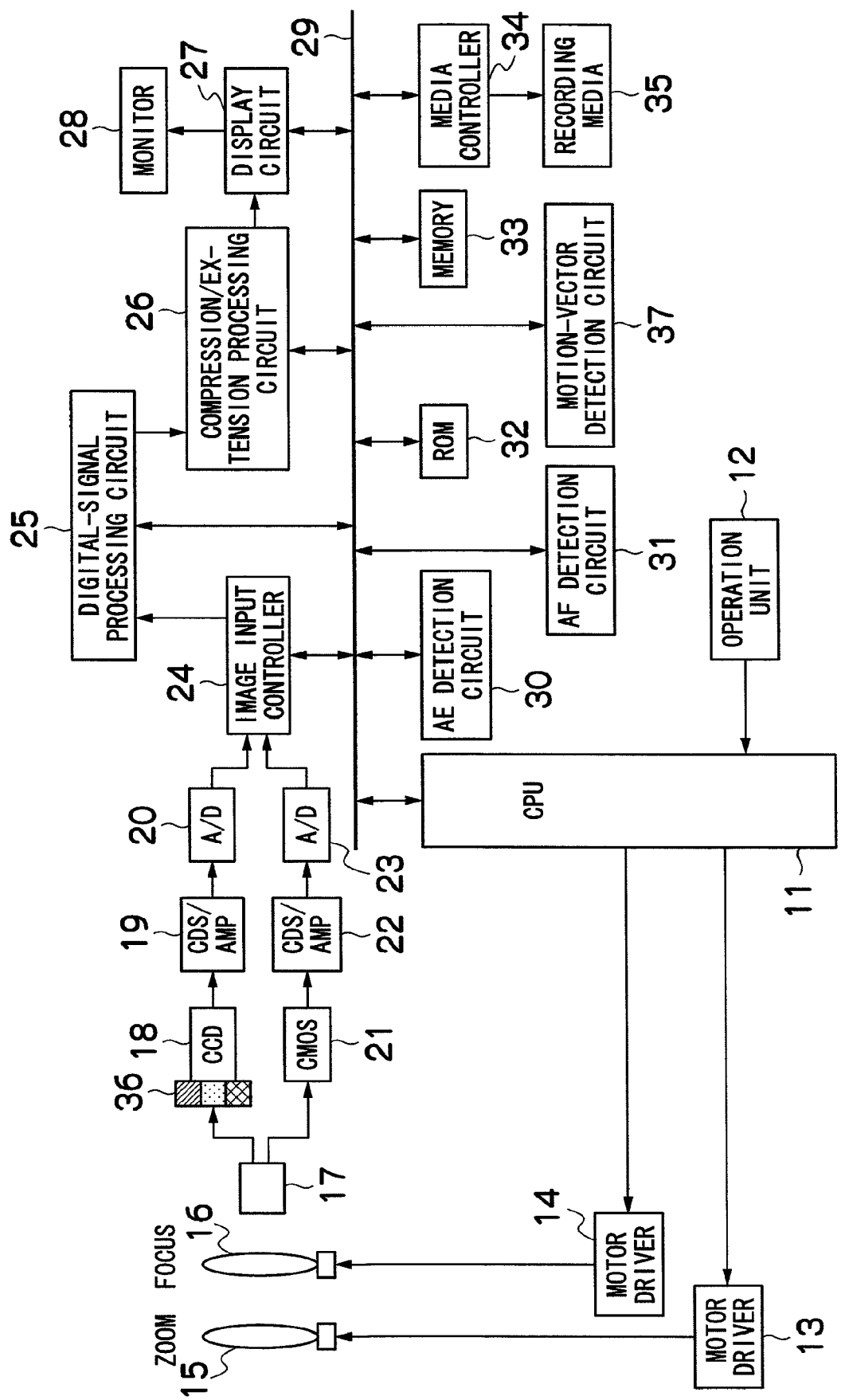
FIG. 1 is a block diagram illustrating an electric structure of a digital camera 10 according to the present invention.

FIG. 1 is a block diagram illustrating an electrical structure of a digital camera 10 according to the present invention.

As illustrated in the diagram, the digital camera 10 according to the present embodiment includes a central processing unit (CPU) 11, an operation unit 12, a motor driver for zooming lens 13, a motor driver for focusing lens 14, a zooming lens 15, a focusing lens 16, a light splitting device 17, a charge-coupled device (CCD) 18, a first analog-signal processing unit 19, a first A/D converter 20, a complementary metal-oxide semiconductor (CMOS) 21, a second analog-signal processing unit 22, a second A/D converter 23, an image input controller 24, a digital-signal processing circuit 25, a compression/extension processing circuit 26, a display circuit 27, a liquid crystal display (LCD) monitor 28, a bus 29, an automatic exposure (AE) detection circuit 30, an auto focus (AF) detection circuit 31, a read only memory (ROM) 32, a memory 33, a media controller 34, a recording media 35, and a motion-vector detection circuit 37.

The CPU 11 controls an operation of each unit and performs a predetermined control program based on an input from the operation unit 12 to control each unit of the digital camera 10.

The ROM 32 records various data necessary for a control in addition to the control program performed by the CPU 11. The CPU 11 reads out the control program recorded in the ROM 32 into the memory 33 and sequentially performs the control programs to control each unit of the digital camera 10.

The memory 33 is used as a performance processing region of the program, a temporary recording region of image data, and a region for each of various operations.

In addition to a shutter button, the operation unit 12 includes a general operation device of a camera such as a power switch and a pickup-image mode dial, and outputs a signal to the CPU 11 according to an operation. The shutter button (not illustrated) includes a switch S1 that enables a camera to prepare for picking up an image, for example by focus locking and measuring light, when it is turned on by half pressed, and a switch S2 that enables the camera to pick up the image when it is turned on by fully pressed.

The zooming lens 15 is driven by the motor driver for zooming lens 13 and moves forward and backward on an optical axis of the focusing lens 16. The CPU 11 controls a movement of the zooming lens 15 via the motor driver for zooming lens 13 to perform zooming.

The focusing lens 16 is driven by the motor driver for focusing lens 14 and moves forward and backward on an optical axis of the zooming lens 15. The CPU 11 controls a movement of the focusing lens 16 via the motor driver for focusing lens 14 to perform focusing.

The light splitting device 17 is disposed at a rear step of the focusing lens 16 and is an optical member such as a prism for splitting object light transmitted through the focusing lens 16 equally split into two.

Figure 2B:
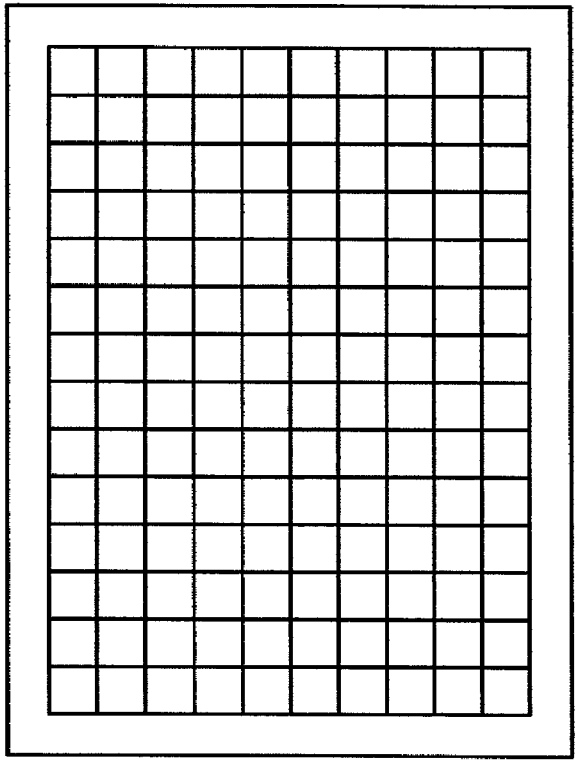
FIG. 2B illustrates an arrangement of elements of a CMOS 21.
Figure 2A:
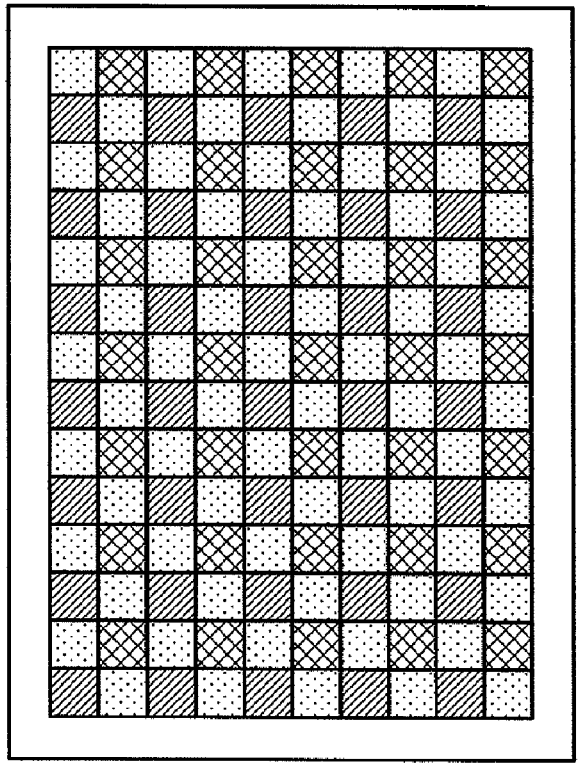
FIG. 2A illustrates an arrangement of elements and a color filter 36 of a CCD 18.

The CCD 18 receives one of the object lights split by the light splitting device 17. One element corresponds to one pixel on a screen of the CCD 18. As illustrated in FIG. 2A, a number of light-receiving elements are two-dimensionally arranged on a light-receiving surface. A primary color filter 36 of red (R), green (G), and blue (B) is disposed corresponding to each light-receiving element in a predetermined arrangement structure.

Further, the other object light split by the light splitting device 17 is received by the CMOS 21. Since the numbers and an arrangement of elements on the CMOS 21 are formed similarly to the CCD 18, the object image similar to that on the CCD 18 can be imaged. However, as illustrated in FIG. 2B, the CMOS 21 is different from the CCD 18 in that a color filter is not disposed on surfaces of the light-receiving elements.

As such, the object light split by the light splitting device 17 forms an image each on a light-receiving surface of the CCD 18 having the color filter thereon and that of the CMOS 21 having no color filter thereon. And, each object light is converted into an electric signal by each light-receiving element.

The CCD 18 and the CMOS 21 may be formed using either one of the CCD and the CMOS for both.

An image signal is started to be output when the digital camera 10 is set to an image pickup mode. That is, when the digital camera 10 is set to a pickup image mode, in order to display a through image on the LCD monitor 28, the image signal is started to be output. The output of the image signal for the through image is once stopped when the present image pickup is instructed, and is started again when the present image pickup is ended.

The image signal output from the CCD 18 is an analog signal, which is received by the first analog-signal processing unit 19. The first analog-signal processing unit 19 includes a correlated double-sampling circuit (CDS) and an automatic gain control circuit (AGC). The CDS removes noise included in the image signal, and the AGC amplifies the image signal removed as the noise at a predetermined gain. The analog image signal on which a required signal processing is performed in the first analog-signal processing unit 19 is received by the first A/D converter 20.

The first A/D converter 20 converts the received analog-image signal into a digital image signal having a gradation width of predetermined bits. This image signal is a so-called raw datum and has gradation values indicating RGB concentration of each pixel.

The second analog-signal processing unit 22 and the second A/D converter 23 have inside structures respectively similar to the first analog-signal processing unit 19 and first A/D converter 20. Required signal processing is performed on the analog image signal output from the CMOS 21 in the second analog-signal processing unit 22, and converted into a digital image signal having a gradation width of predetermined bits in the second A/D converter 23. Having no color film thereon, the CMOS 21 can pickup the image at a frame rate higher than the CCD 18 by a high-speed electronic shutter.

The image input controller 24 has a predetermined amount of line buffer therein, where the image signals for one frame output from the first A/D converter 20 and the second A/D converter 23 are stored. The image signals for one frame stored in the image input controller 24 is stored in the memory 33 via the bus 29. The memory 33 can store the image signals for two or more frames, and both of the image data simultaneously picked up by the CCD 18 and CMOS 21 can be stored.

In addition to the CPU 11, the memory 33, and the image input controller 24, the bus 29 is connected to the digital-signal processing circuit 25, the compression/extension processing circuit 26, the display circuit 27, the media controller 34, the AE detection circuit 30, and the AF detection circuit 31, which can transmit/receive information to each other via the bus 29.

According to an instruction from the CPU 11, the AE detection circuit 30 receives the RGB image signals that are the output signals of the first A/D converter 20 stored in the memory 33 via the image input controller 24 and calculates an integration value necessary for an AE control. The CPU 11 calculates a brightness value from the integration value to obtain an exposure value from the brightness value. Further, according to a predetermined program line map, an aperture value and a shutter speed are determined for the CCD 18 from the exposure value. Furthermore, considering a loss of incident light caused by the color filter 36, a shutter speed is determined for the CMOS 21. Thus, the shutter speed for the CMOS 21 is always higher than the CCD 18.

According to the instruction from the CPU 11, the AF detection circuit 31 receives the output signal of the second A/D converter 23 stored in the memory 33 via the 24, and calculates a focus evaluation value necessary for an AF control. The AF detection circuit 31 includes a focus region extracting unit that cuts out a signal within a predetermined focus region set in the screen, and an integration unit that integrates an absolute value data within the focus region, and outputs into the CPU 11 the absolute value data within the focus region integrated in the integration unit as the focus evaluation value. When the AF control is performed, the CPU 11 searches a position where the focus evaluation value output from the AF detection circuit 31 is the local maximum, and moves the focusing lens 16 to the position to adjust the primary object in focus.

Having no color filter thereon, the CMOS 21 enables all region of visible light to be sampled. Therefore, the CMOS 21 enables a scene to be more accurately in focus even in darkness than a case where the CCD 18 having the color filter 36 is used to obtain the output signal to calculate the focus evaluation value. Further, a signal/noise (S/N) ratio is improved so that noise barely effects focusing.

The AF detection circuit 31 may calculate the focus evaluation value based on the RGB image signals that are the output values of the first A/D converter 20. For this case, a high pass filter through which only a high-frequency component of the G signal passes and an absolute-value processing unit are required.

Figure 3:
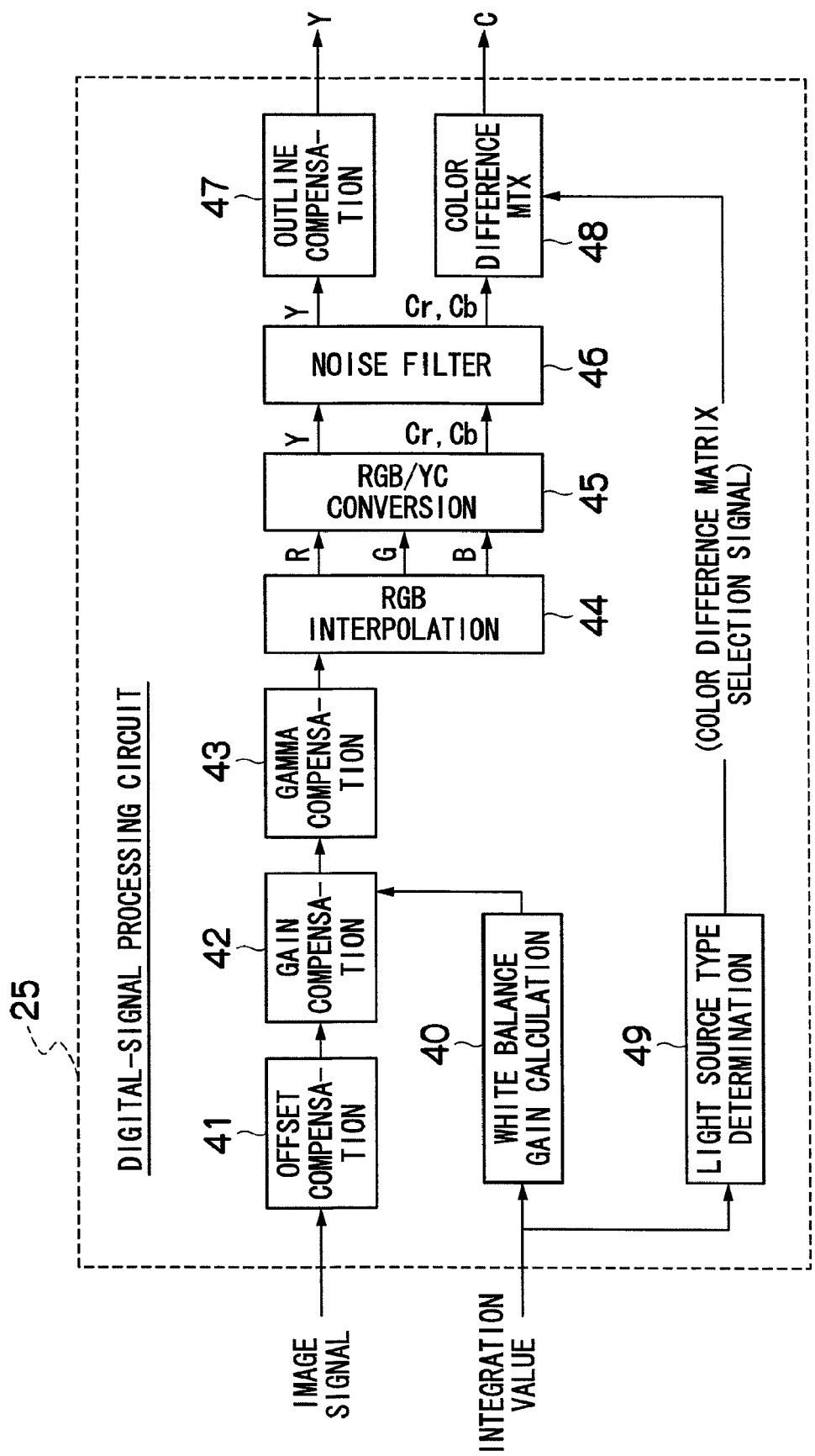
FIG. 3 illustrates an inside structure of a digital-signal processing circuit 25.

The digital-signal processing circuit 25 performs a predetermined signal processing on the image signals of each color of the RGB that are sequentially received and generates the image signal (Y/C signal) formed of a brightness signal Y and color difference signals Cr and Cb. As illustrated in FIG. 3, the digital-signal processing circuit 25 includes a white-balance gain calculation circuit 40 that calculates a gain value for adjusting a white balance gain from integration value data, an offset compensation circuit 41 that receives the image signals of each color of the RGB and performs offset processing, a gain compensation circuit 42 that receives the output signal of the offset compensation circuit 41 and performs the white balance adjustment using the gain value calculated by the white-balance gain calculation circuit 40, and a gamma compensation circuit 43 that performs gamma conversion on the signal output from the gain compensation circuit 42 using a predetermined y value. The digital-signal processing circuit 25 further includes an RGB interpolation operation unit 44 that performs an interpolation operation on the RGB color signals output from the gamma compensation circuit 43 to obtain the signals of the RGB three colors at a position of each pixel, an RGB/YC conversion circuit 45 that obtains the brightness signal Y and the color difference signals Cr and Cb from the RGB signals on which the RGB interpolation is operated, a noise filter 46 that decreases the noise from the brightness signal Y and the color difference signals Cr and Cb, an outline compensation circuit 47 that compensates an outline for the brightness signal Y from which noise is decreased, a color-difference matrix circuit 48 that multiplies the color difference signals Cr and Cb from which noise is decreased by a color difference matrix (C-MTX) to perform color compensation, and a light-source type determination circuit 49 that receives the integration value data to determine a light source type and output the color-difference matrix selection signal to the color-difference matrix circuit 48.

An RGB interpolation operation unit 44 is not necessary when the imaging element has a three plate system. However, since the CCD 18 used in the present embodiment is a solid imaging element having a single plate system, each pixel outputs only one color signal of the RGB. Therefore, the color not to be output is obtained by the interpolation calculation from the G and B signals of surrounding pixels, that is, the G and B color signals are obtained by the interpolation calculation at a position of a pixel where the R is output.

A light-source type determination circuit 49 divides one picked-up screen into, for example, 8×8=64 regions, obtains values of ΣR, ΣG, and ΣB of signal charges in each divided region from the integration value, obtains pairs of data ΣR/ΣG and pairs of data ΣB/ΣG, maps out the 64 pairs of data in a two dimensional space having an R/G axis and B/G axis, and detects a light source type for picking up images from a shape of distributed data. The color-difference matrix circuit 48 is provided with a plurality types of color difference matrixes according to the light source, changes the color difference matrixes to be used according to the type of the light source obtained by the light-source type determination circuit 49, multiply the changed color difference matrix (C-MTX) by the color difference signals Cr and Cb to be input, and outputs the color difference signals Cr' and Cb'.

As described above, the digital-signal processing circuit 25 performs the predetermined signal processing on the RGB image signals that are sequentially received and generates the image signals (Y/C signal) including the brightness signal Y and the color difference signals Cr and Cb.

According to the instruction from the CPU 11, the compression/extension processing circuit 26 performs a predetermined form, for example JPEG, of compression processing on the image signal (Y/C signal) including the brightness signal Y and the color difference signals Cr and Cb that have been input. Further, according to an extension instruction from the CPU 11, extension processing of a predetermined form is performed on the input compressed image data to generate non-compressed image data.

The display circuit 27 controls a display on the LCD monitor 28 according to the instruction from the CPU 11.

According to the instruction from the CPU 11, the media controller 34 controls the recording media 35 to read/write data. The recording media 35 may be removable with respect to a main body of the camera like a memory card, or may be built therein When the recording media 35 is made removable, the main body of the camera is provided with a card slot, where the recording media 35 is mounted for use.

The motion-vector detection circuit 37 calculates a motion vector between images by matching patterns based on a plurality of image data picked up by the CMOS 21, which is a plurality of output signals of the second A/D converter 23 stored in the memory 33.

Figure 4:
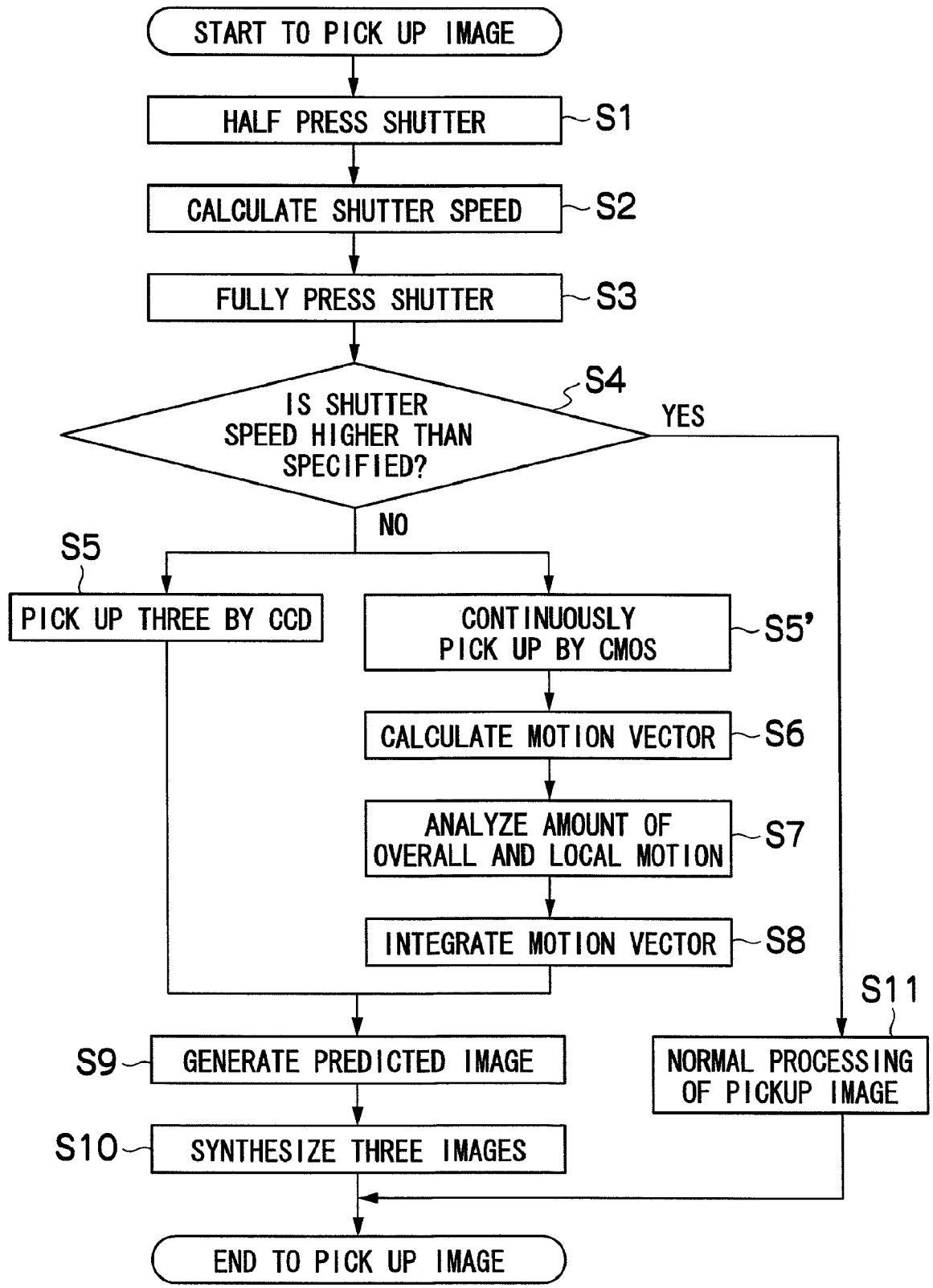
FIG. 4 is a flowchart illustrating an operation of picking up images by the digital camera 10 while compensating hand jiggling.

Next, referring to FIG. 4, the digital camera 10 for picking up images while using hand jiggling compensation will be described. FIG. 4 is a flowchart illustrating operations of the digital camera 10 for picking up images while using the hand jiggling compensation.

Firstly, when the shutter button of the operation unit 12 is half pressed in step S1, the CPU 11 adjusts the primary object in focus based on the focus evaluation value calculated by the AF detection circuit 31, calculates the exposure value based on the integration value calculated by the AE detection circuit 30, and determines the aperture value and the shutter speed for the CCD 18 and CMOS 21 from the exposure value in step S2.

When the shutter button is fully pressed in step S3, the CPU 11 determines whether the shutter speed for the CCD 18 is higher than a specified value in step S4. When the shutter speed is higher than the specified value, the CPU 11 determines that the hand jiggling barely occurs and performs the normal image-pickup processing using the CCD 18 in step S11.

When the shutter speed is slower than the specified value, the CPU 11 determines that the hand jiggling may cause great effects, and picks up images using the hand jiggling compensation. When the hand jiggling compensation is used for picking up images, the CCD 18 continuously picks up three images and also the CMOS 21 continuously picks up images in steps S5 and S5'. Here, referring to FIG. 5, the details of the image picked up by the CCD 18 and CMOS 21 will be described.

Figure 5:
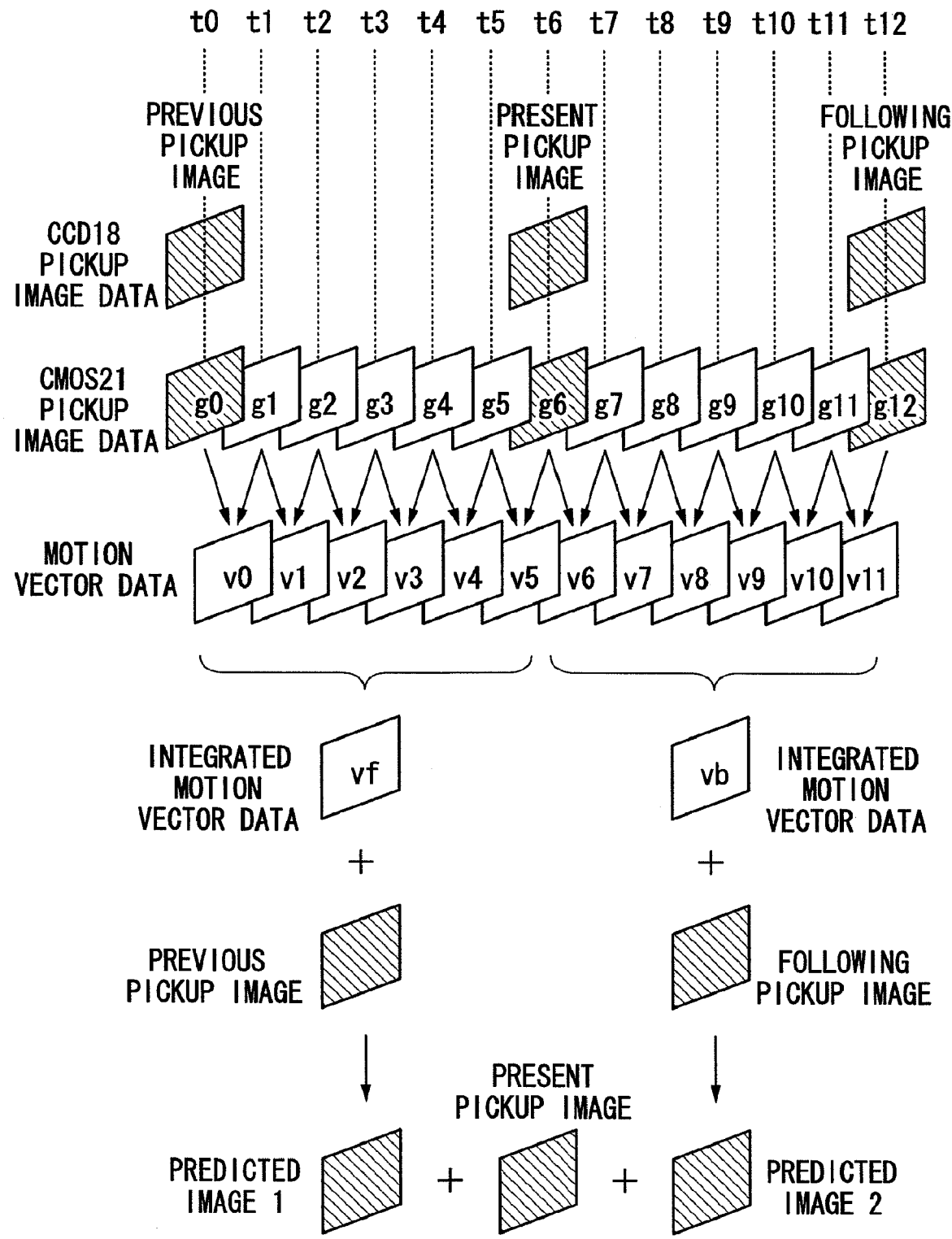
FIG. 5 illustrates processing of motion vector data calculated from timings for picking up images by the CCD 18 and the CMOS 21 and each of the images.

As illustrated in FIG. 5, when the images are picked up using the hand jiggling compensation, the CCD 18 picks up three images of a previous pickup image, a present pickup image, and a following pickup image based on the calculated shutter speed. Supposing that timings for picking up the three images are t0, t6, and t12, the CMOS 21 picks up 13 images of the images g0 to g12 in the time t0 to t12. Now, the image g0 is picked up at the time t0, the image g6 is picked up at the time t6, and the image 12 is picked up at the time t12. That is, the CMOS 21 picks up three images at the same times as the CCD 18 picks up three images, and further picks up five images between each image. These picked-up images are stored in the memory 33. Since the CCD 18 and the CMOS 21 have different shutter speed, the exposure time is controlled by an electronic shutter. As described above, since the shutter speed for the CCD 18 is higher than that of the CMOS 21, the images picked up by the CMOS 21 has less effects of hand jiggling.

Next, the motion-vector detection circuit 37 calculates a motion vector between each image picked up by the CMOS 21 in step S6. As illustrated in FIG. 5, motion vector data v0 is calculated from the images g0 and g1, motion vector data v1 is calculated from the images g1 and g2, and similarly, motion vector data v11 is calculated from the images g11 and g12.

From the motion vector data v1 to v11 calculated as such, an overall motion and a local motion are analyzed in step 7. For performing processing, it is considered that the overall motion is caused by the hand jiggling and the local motion is caused by a motion of the object.

After the motion vector of each frame is analyzed, the motion vector is integrated according to an interval for picking up images by the CCD 18 in step S8, and a predicted image is generated in step S9. That is, an integrated motion vector data vf is calculated from the motion vector data v0 to v5. From the vf and the previous pickup image picked up at the time t0 by the CCD 18, a predicted image 1 of the present pickup image picked up at the time t6 is generated. Further, an integrated motion vector data vb is calculated from the motion vector data v6 to v11. From the vb and a following pickup image picked up at the time t12 by the CCD 18, a predicted image 2 of the present pickup image picked up the time t6 is generated. At this time, a region regarded as a motion of the object is referred from the present pickup image picked up at the time t6.

Finally, a weighted average is calculated using the present pickup image picked up at the time t6 by the CCD 18, and the predicted images 1 and 2, and an image on which the hand jiggling is compensated is output in step S10. In order to obtain a ratio of the weighted average, a timing when a calculated motion vector has less hand jiggling is detected, for example, when the motion vector has less hand jiggling at the time t0, the ratio of the predicted image 1 is increased, while the motion vector has less hand jiggling at the time t12, the ratio of the predicted image 2 is increased.

As described above, since the color filter is not provided at the CMOS 21, high sensitive images can be picked up. Further, the images can be picked up at a high frame rate by the high-speed electronic shutter. Since the motion vector can be sampled with higher accuracy and noise resistance is adopted, it has become easier to distinguish a motion caused by the hand jiggling from a motion caused by the object itself. Therefore, the predicted image having higher accuracy can be obtained from the previous and following images of the present pickup image, and the image having decreased effects of hand jiggling can be obtained.

In the present embodiment, in addition to the timings when the CCD 18 picks up the image, the CMOS 21 picks up five more images, and the motion vectors are calculated from the five images. However, the number of images is not limited to five but any number of images will work. The more the images are picked up, the more accurately the motion vectors can be estimated. However, considering the time required for the motion vector calculation processing and an amount of memory, the number of images may be appropriately determined. Further, since it is considered that the slower the shutter speed is the larger the amount of the hand jiggling becomes, the number of images may be increased when the shutter speed is low. On the other hand, since it is considered that the amount of the hand jiggling is decreased when the shutter speed is high, the number of images may be decreased. Furthermore, the photographic sensitivity by the CMOS 21 is increased to pick up images at the high shutter speed, and thereby the effects of the hand jiggling can be decreased and also more images can be picked up in a short time.

Moreover, in the present embodiment, the light splitting device 17 equally splits the object light into two so that the CCD 18 and the CMOS 21 can receive the same amount of light, however, the light may not be equally split into two.

Embodiment 2

The second embodiment according to the present invention will be described. When picking up a moving image, the digital camera 10 according to the second embodiment estimates a motion vector based on picked up data by the CMOS 21 to encode the moving image. When a moving member is detected in the object, a frame rate of the CMOS 21 is improved to accurately estimate the moving vector.

An electric structure of the digital camera 10 according to the present embodiment is similar to a block diagram of the first embodiment illustrated in FIG. 1. The digital camera 10 according to the present embodiment can pick up the moving image.

Figure 6:
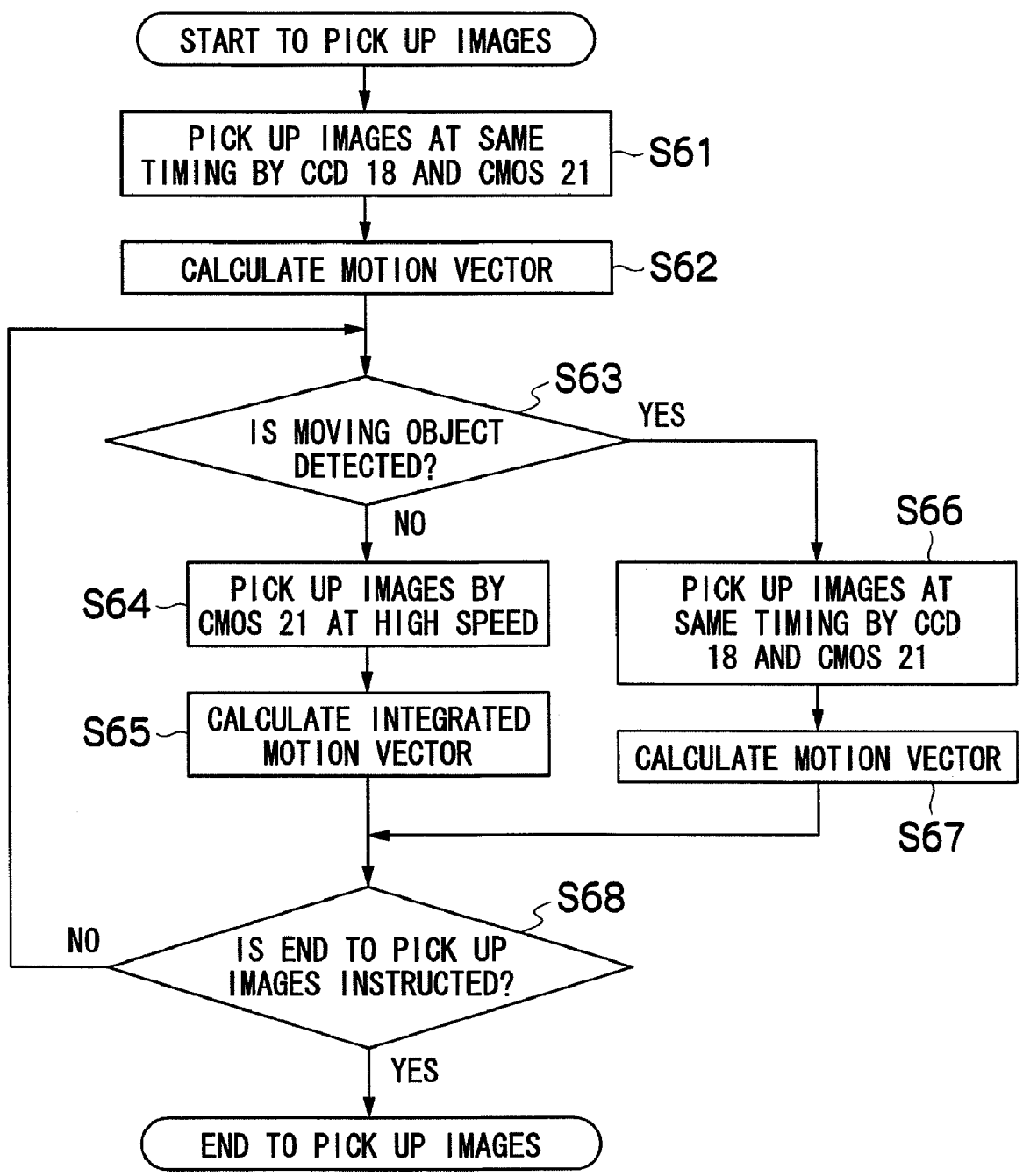
FIG. 6 is a flowchart illustrating processing of picking up moving images by the digital camera 10.

Next, referring to the flowchart of FIG. 6, calculation of the moving vector when the digital camera 10 picks up the moving image will be described.

When starting to pick up the moving image according to an instruction from the operation unit 12, the CCD 18 and the CMOS 21 pick up images at the same frame rate and at the same timing in step S61. And, the motion vector is calculated based on the data of the CMOS 21 in step S62. Now, referring to FIG. 7, more details of the image pickup by the CCD 18 and the CMOS 21 will be described.

As illustrated in FIG. 7, both the CCD 18 and the CMOS 21 pick up images generally at the frame rate 6T/frame. Since the CMOS 21 has no color filter thereon, it picks up the images at a shutter speed higher than that of the CCD 18. The shutter speed of the CMOS 21 is at least controlled by the electronic shutter. Similarly to the first embodiment, the motion-vector detection circuit 37 calculates the motion vector from the pickup image data of the CMOS 21. For example, the motion vector data v1 is calculated from a frame f11 picked up at the time t0 by the CMOS 21 and a frame f12 picked up at the time t6 by the CMOS 21. Since the CMOS 21 picks up the images at the shutter speed higher than that of the CCD 18, the effects of the hand jiggling can be decreased, and thereby the motion vector is correctly estimated. The CPU 11 analyzes the overall motion and the local motion in the screen from the motion vector v1. It is considered that the overall motion is caused by the hand jiggling and the local motion is caused by the motion of the object itself.

In step S63, it is determined whether the object moving exists in the screen from an analysis result of the motion vector. When the moving object does not exist, the CCD 18 and the CMOS 21 pick up images at the same frame rate and at the same timing in step S66. Further, the motion vector is calculated using the pickup image data by the CMOS 21 in step S67, and encodes the moving image using the calculated motion vector. When there is no instruction to end to pick up the images, the motion vector data is again analyzed and it is determined whether a moving object exists in step S63. Further, the processing is repeated.

When the moving object exists in the screen, the frame rate of the CMOS 21 is changed to at a high speed in step S64. As illustrated in FIG. 7, when it is determined that the moving object exists by the motion vector data v1, images are picked up at the frame rate T/frame at the times later than the time t6. When the CCD 18 picks up images, the frame rate is not changed. The CMOS 21 increases the shutter speed according to the high frame rate and also increases the photographic sensitivity according to the shutter speed.

The times later than the time t6, the CCD 18 picks up a frame f2 at the time t6, and f3 at the time t12. During this time, the CMOS 21 picks up a frame f121 at the time t7, a frame f122 at the time t8, . . . , a frame f13 at the time t12. Subsequently, the motion vector data between these frame data is calculated. As illustrated in FIG. 7, the motion vector data v11 is calculated from frames f12 and f121, the motion vector data v12 is from frames f121 and f122 . . . , the motion vector data v16 is from frames f125 and f13.

When the calculation of each motion vector is completed, the integrated motion vector data v110 is calculated from the motion vector data v11 to v16 in step S65. The integrated motion vector v110 is equivalent to the motion vector between the frames f12 and f13, that is, the motion vector between the frames f2 and f3. As such, the motion vector is calculated by integrating the image picked up at the high frame rate, and thereby the motion vector can be correctly estimated. The moving image picked up by the CCD 18 is encoded based on the calculated motion vector.

Subsequently, when there is no instruction to end to pick up images, whether a moving object exists is analyzed from the calculated integrated motion vector in step S63. When a moving object exists, the frame rate of the CMOS 21 continues to be at high frame rate to pick up images in step S64. When a moving object does not exist, the frame rate of the CMOS 21 is returned to the normal frame rate same as that of the CCD 18 to pick up images in step S66.

As described above, when the moving object moving at a high speed is detected, the frame rate of the CMOS 21 is improved by the high-speed electronic shutter to estimate a vector correctly. The motion vector is integrated according to the frame rate of the CCD 18 to be used for encoding, and thereby the quality of the moving image can be improved.

According to the present embodiment, the frame rate of the CMOS 21 is improved six times when the moving object is detected, however, the frame rate may be improved any times.

What is claimed is:

1. An imaging apparatus comprising:
    a light splitting device which splits incident light entering from an object to an imaging optical system into first object light and second object light;
    a first imaging device which includes a color imaging element for receiving the first object light and obtains a first image signal of three primary colors;
    a second imaging device which includes a white-black imaging element for receiving the second object light and obtains a second image signal of white and black;
    a first image-obtaining device which obtains a plurality of the first image signals that are continuously picked up by the first imaging device at a predetermined time interval and include an image signal of a present image pickup;
    a second image-obtaining device which obtains a plurality of the second image signals that are picked up by the second imaging device at a shutter speed higher than that when the first image signals are picked up and include image signals picked up at a timing same as that of the plurality of the first image signal;
    a device which calculates a motion vector between the plurality of the first image signals based on the plurality of the second image signals;
    a device which generates a predicted image signal of the present image pickup based on the motion vector and one or more first image signals other than the image signal of the present image pickup; and
    an image generation device which generates an image based on the image signal of the present image pickup and the predicted image signal thereof, further comprising a device which detects hand jiggling of the image signal of the present image pickup based on the motion vector between the plurality of the first image signals,
    wherein the image generation device generates an image by calculating a weighted average between the image signal of the present image pickup and the predicted image signal thereof to compensate the hand jiggling of the image signal of the present image pickup.

2. An imaging apparatus comprising:
    a light splitting device which splits incident light entering from an object to an imaging optical system into first object light and second object light;
    a first imaging device which includes a color imaging element for receiving the first object light and obtains a first image signal of three primary colors;
    a second imaging device which includes a white-black imaging element for receiving the second object light and obtains a second image signal of white and black;
    a first image-obtaining device which obtains a plurality of the first image signals that are continuously picked up by the first imaging device at a predetermined time interval and include an image signal of a present image pickup;
    a second image-obtaining device which obtains a plurality of the second image signals that are picked up by the second imaging device at a shutter speed higher than that when the first image signals are picked up and include image signals picked up at a timing same as that of the plurality of the first image signal;
    a device which calculates a motion vector between the plurality of the first image signals based on the plurality of the second image signals;
    a device which generates a predicted image signal of the present image pickup based on the motion vector and one or more first image signals other than the image signal of the present image pickup; and
    an image generation device which generates an image based on the image signal of the present image pickup and the predicted image signal thereof,
    wherein the second image-obtaining device obtains the plurality of the second image signals continuously picked up at a time interval shorter than that of the first imaging device,
    further comprising a device which detects hand jiggling of the image signal of the present image pickup based on the motion vector between the plurality of the first image signals,
    wherein the image generation device generates an image by calculating a weighted average between the image signal of the present image pickup and the predicted image signal thereof to compensate the hand jiggling of the image signal of the present image pickup.

3. An imaging apparatus comprising:
    a light splitting device which splits incident light entering from an object to an imaging optical system into first object light and second object light;
    a first imaging device which includes a color imaging element for receiving the first object light and obtains a first image signal of three primary colors;
    a second imaging device which includes a white-black imaging element for receiving the second object light and obtains a second image signal of white and black;
    a first image-obtaining device which obtains a plurality of the first image signals that are continuously picked up by the first imaging device at a predetermined time interval;

a second image-obtaining device which obtains a plurality of the second image signals that are picked up by the second imaging device at a shutter speed higher than that when the first image signals are picked up and include image signals picked up at a timing same as that of the plurality of the first image signal;

a device which calculates a motion vector between the plurality of the first image signals based on the plurality of the second image signals; and a device which compresses and encodes the plurality of the first image signal using the motion vector, further comprising a device which detects a moving object based on the motion vector, wherein, when a moving object is detected, the second image-obtaining device obtains the plurality of the second image signals that have continuously picked up the moving object at a time interval shorter than that when the first imaging device picks up the images, wherein, when a moving object is detected, the second imaging device increases photographic sensitivity.

* * * * *